Sept. 6, 1966   A. S. TCHIMENOGLOV ETAL   3,270,487
MULTI-UNIT BOTTLE SET-UP MACHINE
Filed April 17, 1962   9 Sheets-Sheet 4

INVENTORS
ALEXANDER S. TCHIMENOGLOV
LOUIS J. IOCCA JR.
BY GILBERT L. OFFENHARTZ
Constantine A. Michalos
ATTORNEY Sept. 6, 1966    A. S. TCHIMENOGLOV ETAL    3,270,487
MULTI-UNIT BOTTLE SET-UP MACHINE
Filed April 17, 1962

INVENTORS
ALEXANDER S. TCHIMENOGLOV
LOUIS J. IOCCA JR.
GILBERT L. OFFENHARTZ
BY Constantine G. Michalos
ATTORNEY United States Patent Office 3,270,487
Patented Sept. 6, 1966

3,270,487
MULTI-UNIT BOTTLE SET-UP MACHINE
Alexander S. Tchimenoglov, 422 N. 8th St., Fairview, N.J.; Louis J. Iocca, Jr., 46 Leonard St., Jersey City, N.J.; and Gilbert L. Offenhartz, 15 Parkview Drive, Milburn, N.J.
Filed Apr. 17, 1962, Ser. No. 188,124
13 Claims. (Cl. 53—393)

This invention relates generally to bottling machines, and more particularly to a method and apparatus for automatically and concurrently setting up a plurality of bottles or other containers for cleaning, filling and capping.

Heretofore, it has been necessary to remove the empty bottles from their cases and singly convey each bottle to each piece of processing equipment. It was necessary to individually time and position every bottle to insure proper indexing at each piece of processing equipment, before the bottle could be cleaned, filled or capped, by that piece of equipment. Not only was it necessary to time and position each bottle previously to entering each separate piece of bottling equipment but after all operations of bottling were completed, the individual bottles had to be precisely repositioned so that they could be repacked in their shipping cases. In contrast, the proposed method permits case-unit processing of the bottles. That is, the bottles are precisely positioned while still in their receiving case and this position maintained throughout subsequent steps in the bottling process.

The present industrial method of processing bottles such as for cleaning, filling and capping, was unsatisfactory because it required precise synchronization and multiple timing of each bottle through each piece of processing equipment, as hereinbefore stated. Therefore, the former bottle-unit method of bottle processing was relatively inefficient, costly and limited in potential productivity. Furthermore, the bottle-unit processing method was undesirable because of conditions and restrictions associated with it. That is to say that the impact and inertial forces inherent in this system caused excessive bottle breakage and bottle tipping. These forces are particularly objectional when processing lightweight bottles. In addition, proper synchronization required physical contact between bottles and equipment. This synchronization was difficult to attain when processing semi-rigid bottles such as plastic bottles. Consequently, it was difficult to successfully adapt the bottle-unit method to the efficient processing of semi-rigid bottles.

The purpose of this invention is to provide more efficient bottling and packaging by providing an efficient and improved method and apparatus of concurrently processing bottles in unit groups so that each bottle in a unit group is in substantially the same stage of processing.

One of the objects of this invention is to provide a simple bottle set-up device which sets up a unit group of bottles to be processed concurrently in such unit groups.

Another object of this invention is to provide an automatic device that will permit a plurality of bottles in case units to be processed without being removed from their cases. That is, this invention provides means of setting up bottles so that they can be cleaned, filled and capped, each stage at a time, concurrently in their unit groups, while still in their cases.

A further object of this invention is to provide a device for setting up lightweight bottles, such as plastic bottles, in groups to be processed concurrently while avoiding the danger of tipping and spilling due to the present impact methods of transportation, and due to the effect of inertia.

Still another object of this invention is to provide a means of automatically packing and unpacking bottles in cases.

Other objects and features of the invention will become apparent as the following description of an exemplary physical embodiment of the invention progresses. It should be understood that the herein physical embodiment is by way of exemplification only and that other and different constructions can be used. In the accompanying drawings, which form a part of this specification, like characters of reference have been applied to corresponding parts throughout the several views which make up the drawings.

Figure 1:
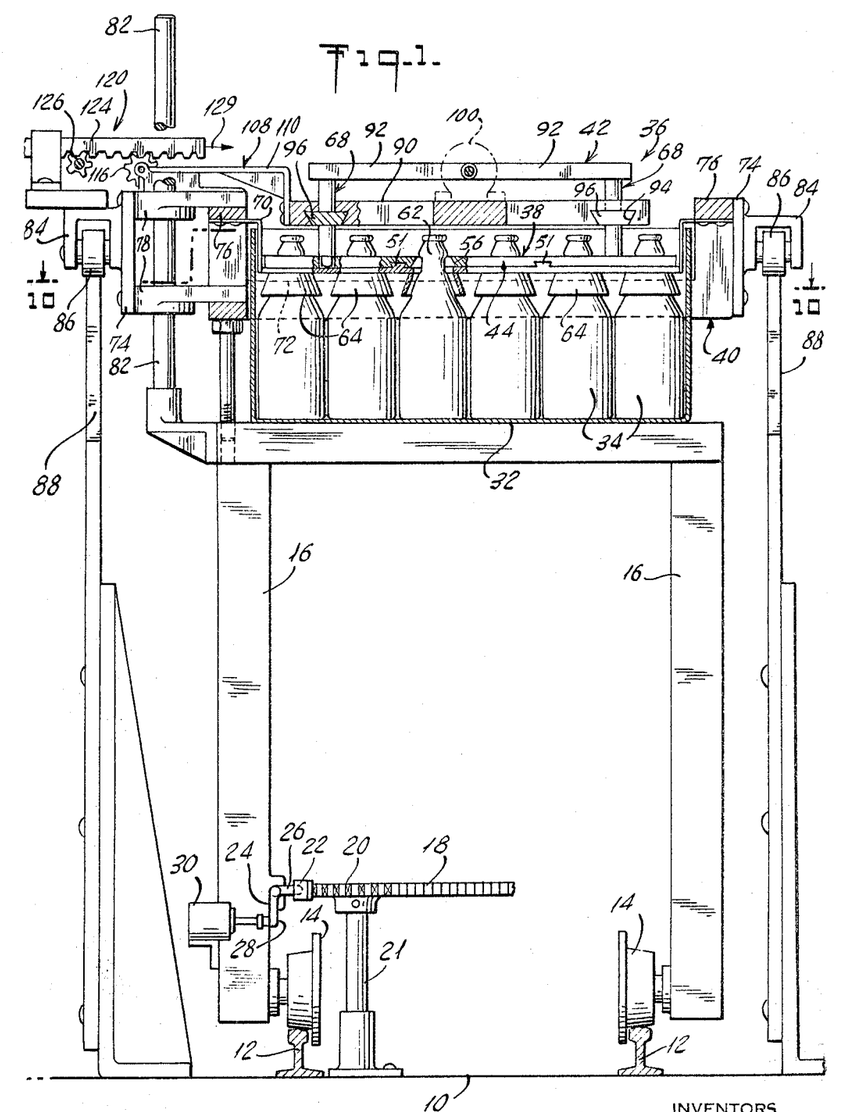
FIGURE 1 shows an end elevation, partly in section, of a preferred embodiment of my invention.

Referring now to the drawings and particularly to FIGURE 1, it will be seen that on a floor 10 of a building may be mounted a pair of suitable endless rails or tracks 12 on which ride wheels 14 of a support carrier 16. Moving parallel to the tracks, is an endless chain drive 18. The chain moves around and is driven by a gear 20 which is supported by a bracket 21 extending from the floor 10 and which is driven by a motor (not shown).

Integral to the chain are spaced dogs 22 which move linearly with the chain. Each dog extends to drive the carrier 16 by making contact with a bell crank 24 pivotally mounted on the carrier. The bell crank consists of two arms, a horizontal arm 26 for accepting contact from the dog and a vertical arm 28 actuated by a solenoid 30 which drives the arm 26 into the path of the dog 22.

In the embodiment used to illustrate the invention, the carrier 16 has two purposes. A first purpose is to support a case 32 filled with empty bottles 34, through various processing stations, such as cleaning, filling or capping, and a second purpose, to support a device or jig 36, which sets up the bottles for processing at these stations. The main purpose of the jig 36 is to engage and elevate the bottles out of their cases to facilitate the processing as hereinafter more fully described.

Figure 2:
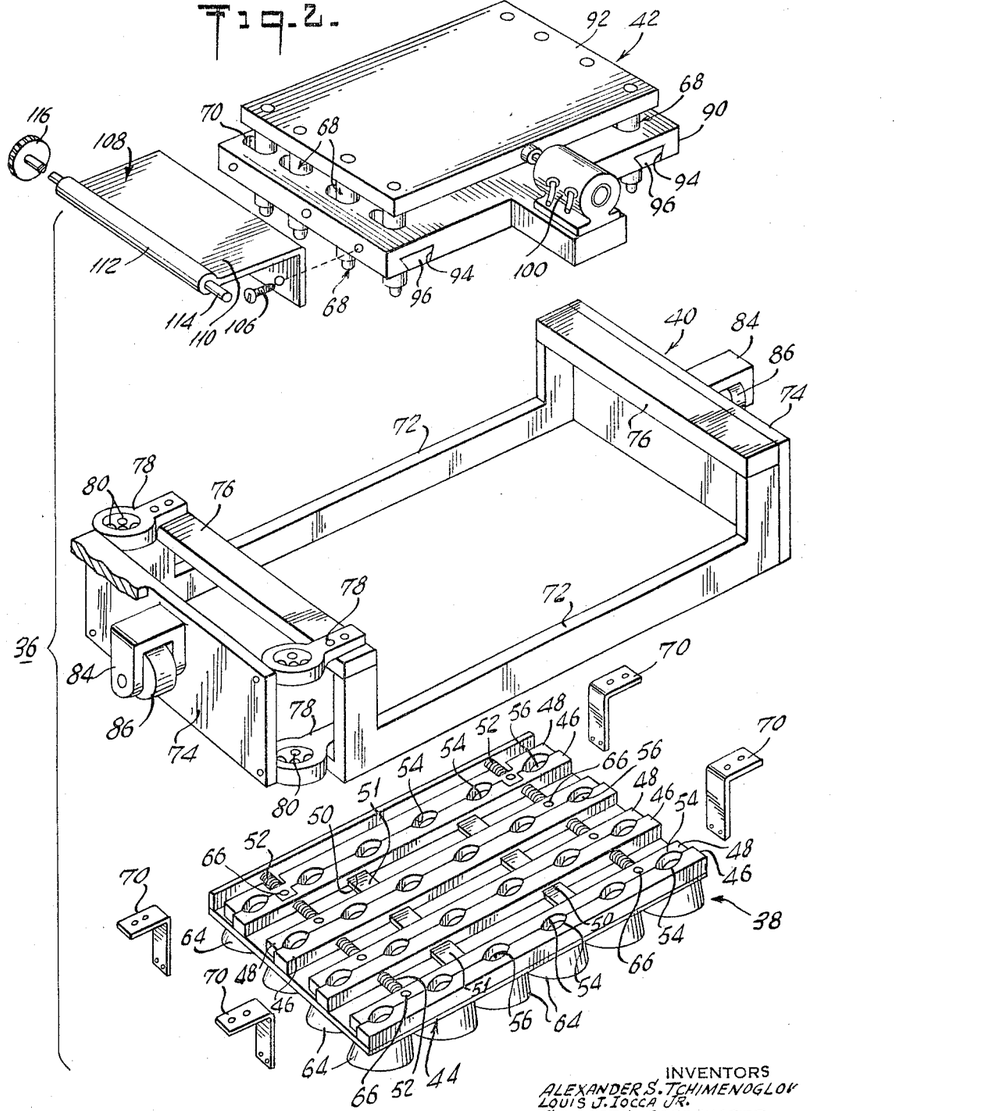
FIGURE 2 is an extended view of some of the components of the embodiment shown in FIGURE 1.
Figures 6, 7:
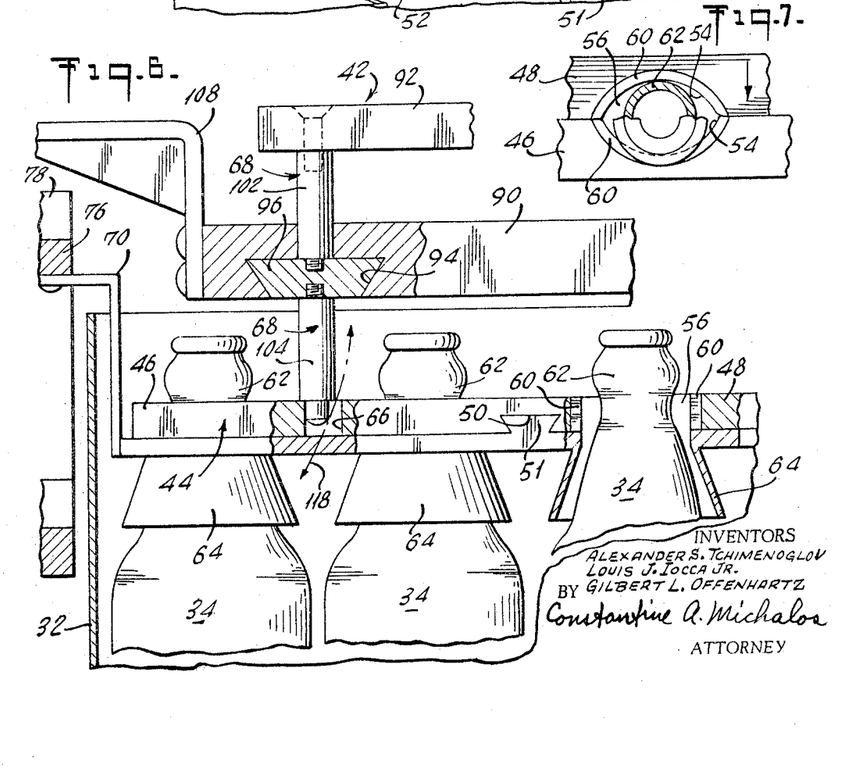
FIGURE 6 is a sectional view taken through line 6—6 of FIGURE 5 showing the components of FIGURE 2 in an assembled position.
FIGURE 7 is a view as FIGURE 5 showing the elements of the components at a different position.
Figure 10:
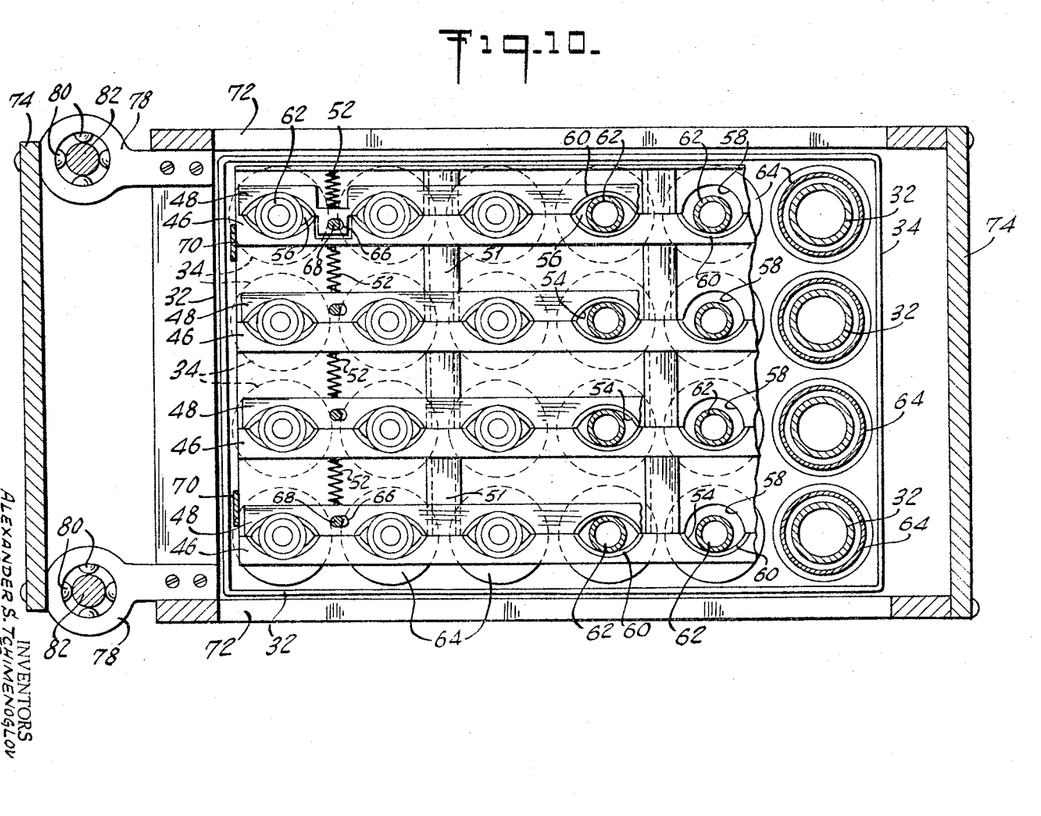
FIGURE 10 shows a plan sectional view taken through line 10—10 of FIGURE 1.

Referring to FIGURE 2, the jig 36 is comprised of a clamping mechanism 38, a saddle frame 40, and a clamp opener 42. The clamping mechanism 38 is comprised of a bottle plate 44, a plurality of stationary jaws 46, and a plurality of opposed movable jaws 48. The fixed jaws and the base plate may be formed in a single piece as by casting or its parts may be separately fabricated. To enable the movable jaws 48 to slide back and forth, there are provided keyways 50, and keys or tracks 51 along which the movable jaws 48 may be guided (as best shown in FIGURE 6). The tracks 51 are secured to the stationary jaws 46, such as by welding, to allow the movable jaws 48 to slide to or away from the stationary jaws 46. The jaws 46 and 48 are normally clamped together by the spring action of springs 52 and can be separated by the clamp opener 42, as hereinafter more fully described. The jaws 46 and 48 are provided with a series of opposed cut-outs 54 forming openings 56. In addition, referring to FIGURE 10, the bottle plate 44 is provided with openings 58 just below the openings 56. The cut-outs 54 are provided with cushioning and anti-slipping means such as rubber pads 60 (see FIGURE 11) to securely hold the protruding necks 62 of the bottles 34 when the jaws 46 and 48 are clamped together. Secured to the underside of the plate 44, at each opening 58 are vertical and downwardly projecting funnels or guides 64. The openings 56 are of a size and shape to accommodate the necks 62 of the bottles 34 (as best shown in FIGURE 10). The guides 64 position and facilitate the entrance of the necks of the bottles within the openings 56 when the plate 44 is lowered over the top of the bottles. It should be understood that the bottom of the frame 40 may also be provided with guides (not shown) to facilitate the lining up of the case itself within the frame when the frame is lowered with the plate over the case.

Figure 5:
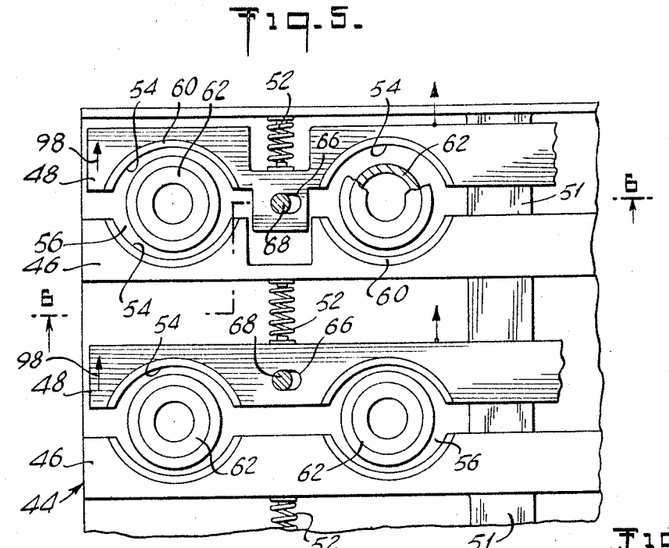
FIGURE 5 is an enlarged fragmentary view, partly in section, of one of the components shown in FIGURE 2.
Figure 11:
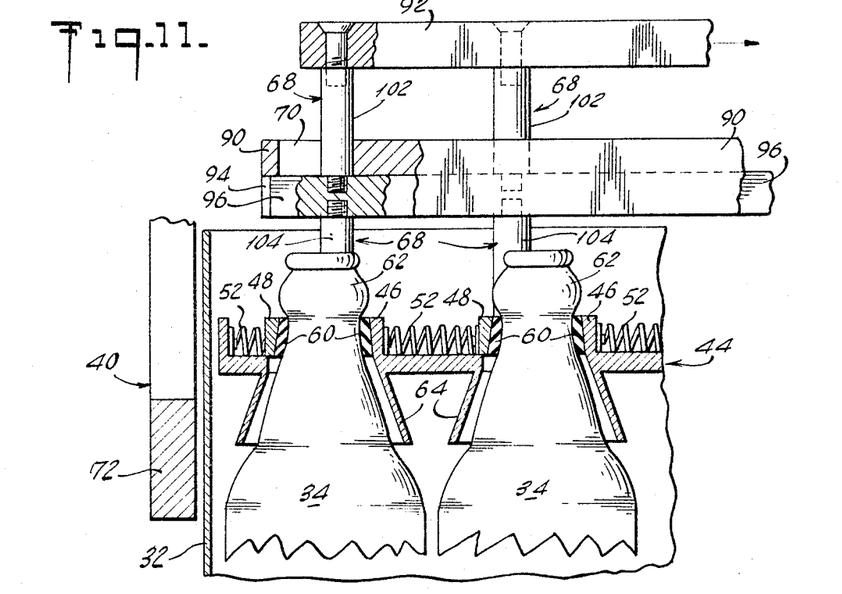
FIGURES 11 and 12 are enlarged fragmentary views of FIGURE 8, taken in cross-section, showing two stages of operation of the components shown in FIGURE 2.
Figure 12:
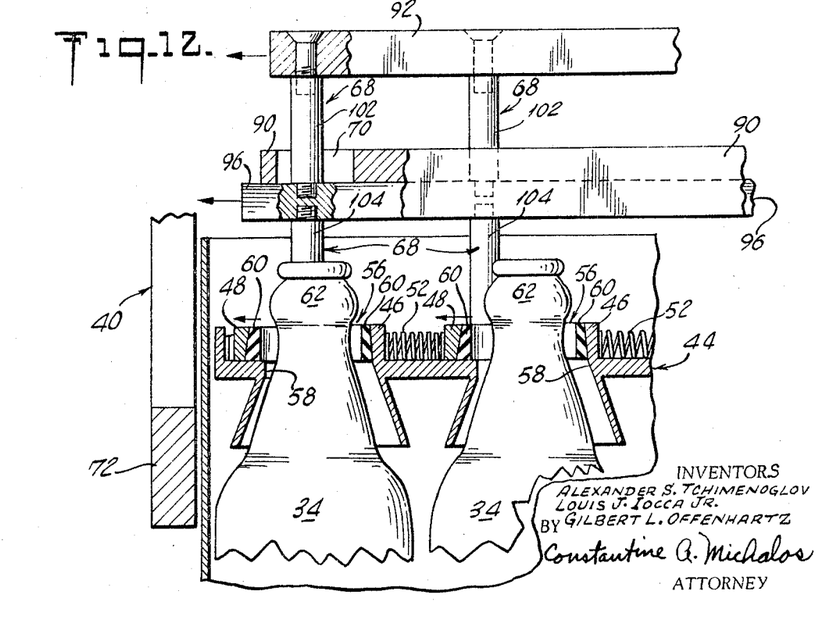

FIGURES 7, 10 and 11 show the movable jaws 48 clamped against the stationary jaws 46 by the springs 52 to hold the bottles. The movable jaws may have milled keyways which are keyed to and slide on keys 51 as hereinbefore stated. They are normally in a spring loaded closed position. Therefore, it should be understood that the jaws have to be held open by the clamp opener 42 before the necks of the bottles can fit through the openings 56 and be clamped by the jaws 46 and 48 through the spring action after reverse action of the clamp opener is performed. The clamp opener 42 is used for releasing the clamping action of the springs by engaging two series of holes 66 and actuating the movable jaws against the spring action of the springs 52, as best shown in FIGURES 5 and 12. The actual contact of the clamp opener with holes 66 is by pins 68 extending from the underside of the clamp opening means, as best shown in FIGURES 5 and 6, and, as hereinafter more fully described.

Figure 3:
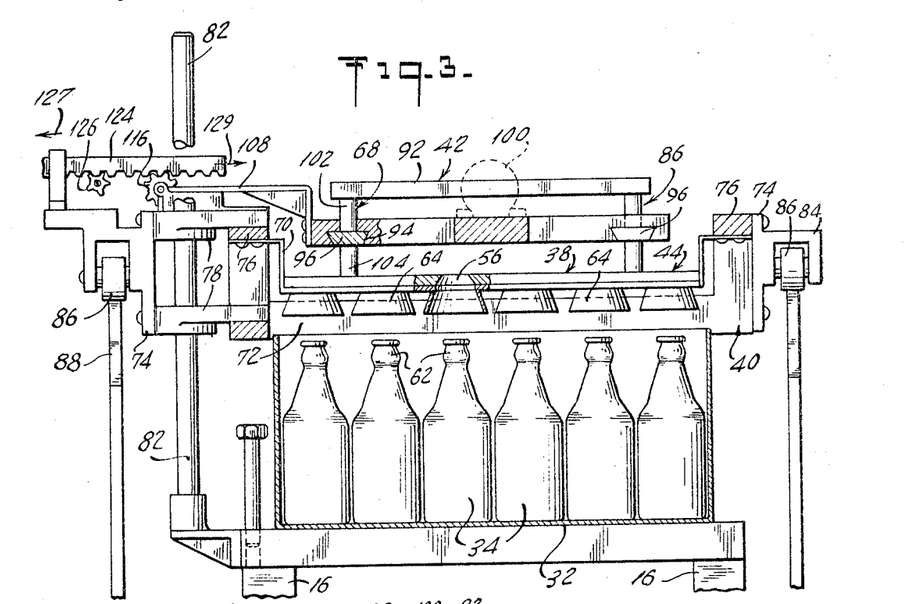
FIGURE 3 is a partial end elevation of the embodiment shown in FIGURE 1, but at a different stage of operation.
Figure 4:
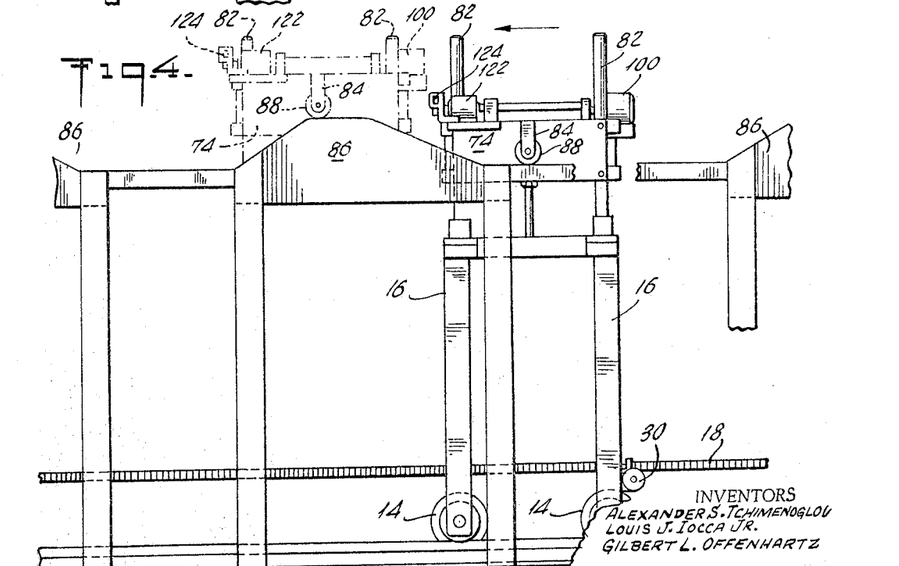
FIGURE 4 is a side view of two subsequent stages of the embodiment shown in FIGURE 1.
Figure 8:
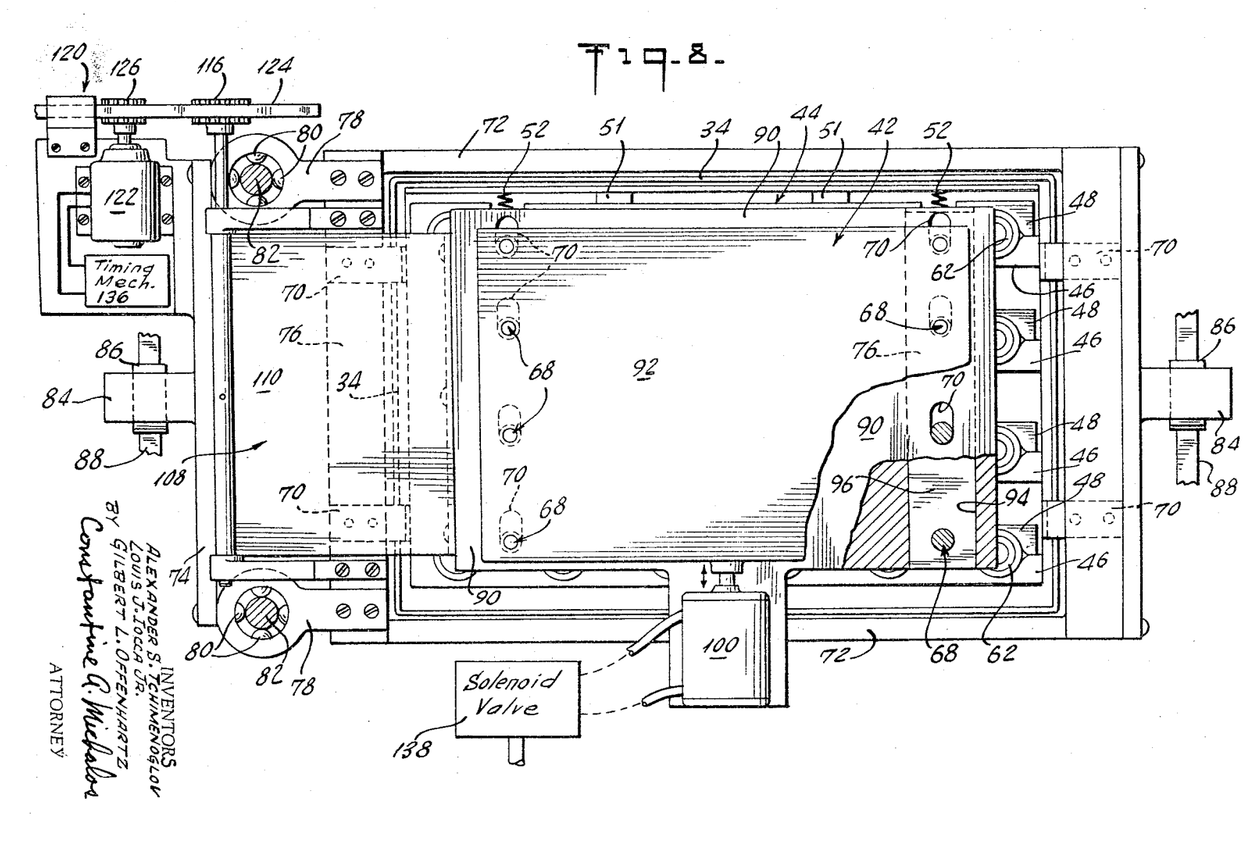
FIGURE 8 is a partial plan view of FIGURE 1, with parts broken away to show detail.
Figure 9:
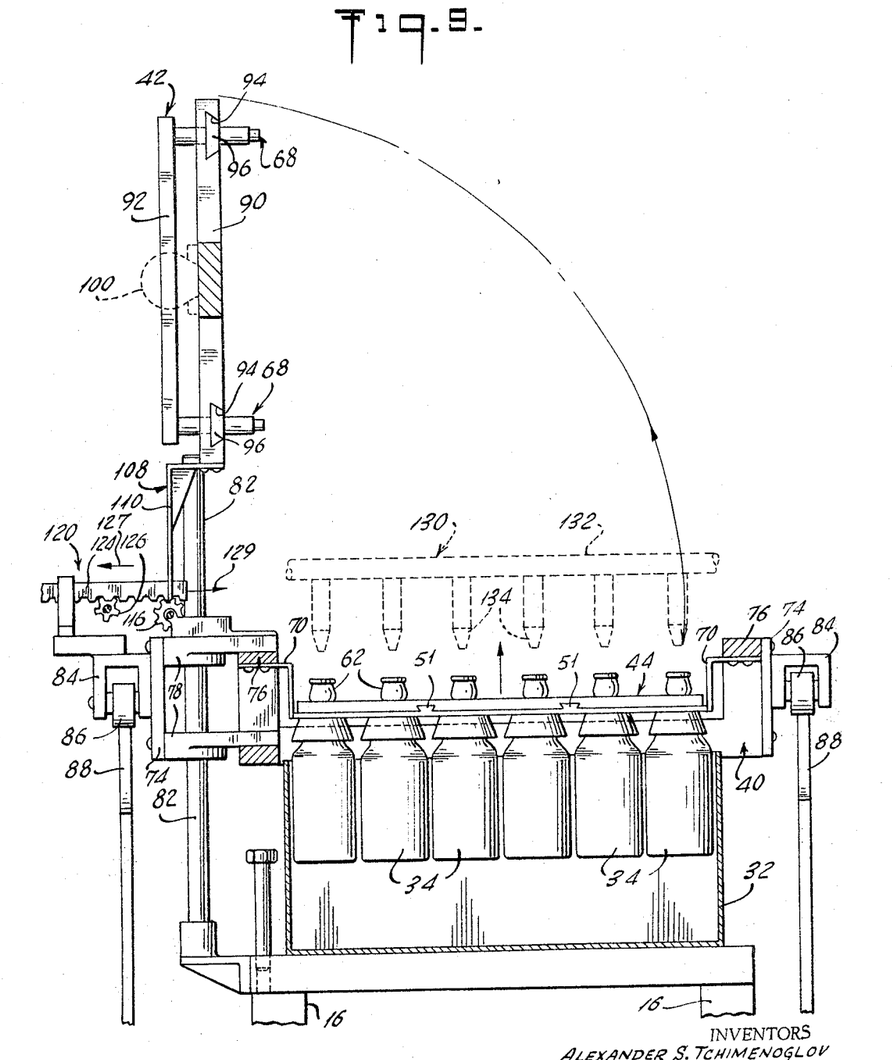
FIGURE 9 is a partial end elevation as that shown in FIGURE 1, but with the components in a different position.

The clamp means is connected to the frame 40 by means of brackets 70, as best shown in FIGURES 1, 3 and 9. The frame 40 is constructed to fit around the outside of the case 32 when the clamping mechanism 38 is introduced inside the case and over the necks of the bottles as best shown in FIGURE 1. Still referring to FIGURE 2, but also to 8 and 10, it will be seen that the frame comprises side plates 72, end plates 74 and end cross plates 76. At one end plate 74, connecting that end plate with the cross plate 76 and with the lower portions of one end of the side plates 72, are four bearing housings 78. Rotatably secured within the housings are ball bearings 80 that ride on vertical members or rods 82 permitting the whole jig 36 to be elevated and lowered by cam means as hereinafter described. Secured at both end plates 74 are brackets 84 in which are rotatably mounted rollers or cam followers 86. The cam followers 86 riding on cams 88 as best shown in FIGURE 4, provide the vertical action is obtained when the cam followers contact the cams 88 (located on each side of the carrier 16) as the cam followers together with the carrier move linearly along the tracks 12 when driven by the drive chain 18.

Referring again to FIGURE 2, it can be seen that the clamp opening means 42 is comprised of a clamp opening plate 90 which is approximately the size of the bottle plate 44, and a pin carrying plate 92 located above the clamp opening plate. Slidable in a keyway 94 formed within the clamp opening plate, is a key 96. To the key 96 are secured the pins 68 which contact the holes 66 of the clamp means 38 as hereinbefore described. As shown in FIGURES 7 and 9 the tips of pins 68 extend into holes 66 to move the jaws 48, and work against the spring load in the direction as shown by arrows 98 of FIGURE 5 to open the clamp mechanism. The actuating force needed to move the pin carrying plate 92 is provided by a power means such as an air cylinder 100. Referring to FIGURE 6, the pin 68 may consist of an upper pin 102 and a lower pin 104, each threaded to the key 96 for assembly.

Secured at one end of plate 90, such as by bolts 106, is an angle 108. At the end of the horizontal leg 110 of the angle 108 is integral bushing 112 in which is rigidly secured a rod 114. Axially secured to the rod 114 is a gear 116. It should be noted that the angle 108, with the bushing 112, rod 114 and gear 116 are secured together and the rod 114 does not rotate within the bushing 112, nor does the gear 116 rotate around the rod 114. Therefore, a rotation of the gear 116 one fourth of a turn counter-clockwise, as viewed from FIGURE 2, would cause the whole clamp opening means 42 to move from the horizontal position such as that shown in FIGURES 1 and 3 to a vertical position such as that shown in FIGURE 9. It should be also noted in FIGURE 6 that the holes 66 are elongated laterally to permit the pin tip to rotate into and out of the holes 66 as shown by the arrows 118 in FIGURE 6.

Referring to FIGURE 8, with FIGURES 1, 3 and 9 it can be seen that a second actuating means 120 comprises a motor 122, a rack 124 and a gear 126. When the gear 126 is rotated by the motor in a counter-clockwise direction as viewed from FIGURE 3, it would move the rack to the left as shown by arrow 127. The rack would then rotate the gear 116 to raise the clamp opening means in a vertical position as shown in FIGURE 9. When the gear 126 is rotated by the motor in a clockwise direction as viewed from FIGURE 1, it would move the rack to the right as shown by arrow 129. The rack would then rotate the gear 116 to lower the clamp opening means in a horizontal position as shown in FIGURE 1. Therefore, the clamp opening means may be rotated into a horizontal position, so that its pins 68 can then engage the holes 66, so that by means of the actuation of the separate air cylinder 100, attached as in FIGURE 8, the movable jaws 48 can be opened. After closing, in a later stage of operation, the clamp opener can be raised to a vertical position, out of the way, to permit the cleaning, filling and capping of the bottles.

FIGURE 9, showing the vertical position of the clamp opener, also shows the present device at one of the processing stations. The schematic drawing of the processing accessory 130 shown can be either a cleaning or filling machine as well as a multi-unit capping device. In the case of the former two, the fluid is transported to the manifold 132 from a main source of supply (not shown) and is directed into the bottle by a plurality of nozzles 134 as the present device, carrying the bottles, goes through the processing station.

It will be apparent from the foregoing description that I have provided an improved bottling set up machine which is capable of setting up a plurality of bottles for cleaning, filling and capping, using a multiple clamp unit arrangement.

A description of the operation of this device is as follows: The carrier 16 with the case of bottles on it travels on tracks 12, driven by the drive chain 18, using the dog attachments 22 and the bell crank 24 connection. The solenoid 30 holds the bell crank in the engaged position with the dog so the drive chain can move the carrier from station to station. The bell crank pivots to actuate arm 24 out of engagement with the dog 22 when the carrier must be stopped at a processing station, should this be needed, although with certain accessory equipment the carrier need not be stopped.

While the carrier with the case of empty bottles is moving to a desired station for processing, as shown in FIG- URE 3 and as shown in FIGURE 4 in solid, the pins of the clamp opener 68 are engaged in the holes 66. While the carrier is still moving, the clamp opener is forcibly actuated by the air cylinder 100 which itself is actuated by a solenoid valve 138 and timer 136. When the clamp opener is actuated with the pins engaged, the clamp itself is opened, as shown in FIGURE 5. Then the entire jig is lowered, as shown in phantom in FIGURE 4, into the case so that the necks of the bottles protrude through the clamp jaw openings 56. This lowering of the jig is caused by the cam tracks 88 acting upon the cam followers 86, the latter of which are attached to the jig. Note that the funnel-shaped guides 64 position and guide the bottles into the clamps. Also note that the sides of the saddle frame 40 are on the outside of the case.

After the bottle necks protrude through the clamp cut-out openings 56, the pressure in the air cylinder is released and the movable clamp jaws 48 close upon the bottle necks. This closing is caused by spring 52.

Thereupon the entire jig, again by means of the cam track, is elevated to the extent that the necks of the bottles extend above the top of the case (see FIGURE 9). At this time, with the carrier still in motion, the timer 136 actuates the reversible motor 122, which rotates the gear 126, which drives the rack 124 in the direction shown by arrow 127.

This in turn rotates gear 116 which is rigidly attached to the clamp opener, as best shown in FIGURE 2. It will become immediately apparent that the clamp opener will rotate around an axis provided by rod 114 so that the clamp opener will swing to a vertical position as illustrated in FIGURE 9, thus leaving a clear space directly above the bottles so that accessory equipment can work on them.

When the carrier moves into a position directly under accessory equipment 130, the bell crank pivots, as aforesaid, disengaging the dogs and permitting the carrier to stop so the bottles can be processed. When the step of processing at any particular station is completed the bell crank re-engages the dogs and the carrier is moved to the next station. When the carrier has moved through the final piece of accessory equipment, such as a capper (not shown), the clamp opener is lowered again so that the clamp opener pins 68 are engaged in the clamp holes 66.

At that time the entire jig, with the bottles still held in the jaws is again lowered into the case by means of the cam track and the cam followers. Then, when the bottles again rest on the bottom of the case the air cylinder 100 actuates the clamp opener.

It is at that time, with the clamps opened and the bottles released that the cam track again elevates the now empty jig to a point above the case and free of the case so that the case of filled bottles can be removed from the carrier and a new case of empty bottles may be put on.

When loading or unloading cases on or from the carrier, the cases can be taken right off or put right on a conveyor belt, or chute, or stand.

It should be understood that the size and construction of the carrier and jig can be expanded so that several cases can be accommodated at one time.

It should further be understood that the present invention can be provided with a carrier platform which is not directly connected to the vertical member 82 so that the platform could then with an independent mechanism be lowered far below the jig mechanism; this embodiment being useful in packing and unpacking bottles in and from cases.

In other words, whether the clamping assembly, with the bottles engaged thereby, is raised from the case or whether the assembly retains its level and the case is lowered is a matter of choice.

Figure 13:
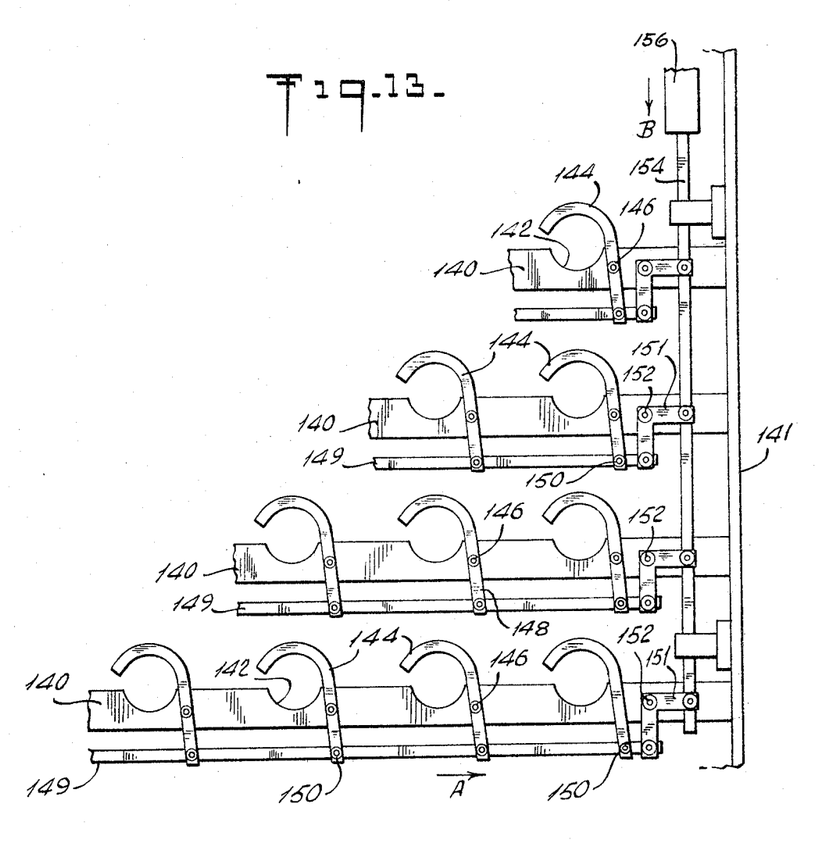
FIGURE 13 is a broken plan view of a modified form of clamping mechanism.

In the modified clamping mechanism shown in FIG. 13 there is provided a frame having a plurality of spaced longitudinal rails 140 supported in fixed relation by end rails 141, said longitudinal rails having spaced recesses 142, each forming a fixed jaw corresponding to the cutouts 54 of FIG. 2. In this instance, however, the movable jaws 144 are separately formed and have pivotal rather than linear movement.

Each jaw may be of substantially J-shape and is pivoted at 146 on rail 140 and has a section 148 extending beyond the pivot. The several jaws on each rail are connected by an operating lever 149 having pivotal connections 150 therewith.

At the end of each rail, bell crank lever 151 pivoted on the frame at 152 connects longitudinal levers 148 with a single transverse lever 154. Suitable spring means (not shown) urge the operating levers 146 in the direction of arrow A to cause jaws 144 to clamp the bottles. To release the bottles a reciprocating plunger 156 suitably mounted on the fixed frame moves transverse lever 154 in the direction of arrow B.

It is, therefore, apparent that the invention hereinbefore described may be varied in construction within the scope of the claims, for the particular device selected to illustrate the invention is but one of many possible embodiments of the same. The invention, therefore, is not to be restricted to the precise details of the structure shown and described.

What is claimed is:

1. An automatic device that will enable a plurality of bottles in a case unit group to be processed while still partially within their case, comprising:
    (a) a clamping means operable to be inserted into the case to grasp the bottles concurrently,
    (b) a substantially saddle-shaped frame operable to fit on the outside of the case, and supporting the said clamping means such that when the bottles are held by the clamping means said frame permits a clear space directly over the necks of the bottles to be completely transversed from front to back for processing, and
    (c) means to separate said bottles from the floor of the case a predetermined distance, whereby said bottles may be presented for the process of cleaning, filling or capping.

2. A means of setting up bottles so that they can be cleaned, filled or capped, each stage at a time, concurrently in their unit group, while still in their cases, comprising:
    (a) a plurality of clamping means operable to be inserted within the case to clamp the necks of the bottles below their openings,
    (b) a substantially saddle-shaped frame having both sides lower than its ends permitting thereby unobstructed space between its ends such that when the bottles are held by the clamping means said frame permits a clear space directly over the necks of the bottles to be completely transversed from front to back for processing and which is capable of supporting said clamping means, and
    (c) separating means operable to separate the clamped bottles from their case in a unit group so as to be able to present the bottles to be processed concurrently at one of the processing stations.

3. A means of setting up bottles as claimed in claim 2 characterized in that said separating means comprise a cam and cam follower operable to lift the clamping means in a group in the space afforded by the frame between its ends and to present the bottles at a predetermined elevation to be processed concurrently at one of the processing stages.

4. An apparatus for setting up bottles to be processed concurrently at a processing station while substantially within their cases, comprising:
    (a) a carrier supporting the case of bottles,
    (b) a disengageable driving means operable to move said carrier to a processing station,
    (c) a frame vertically movable on said carrier and operable to align the case on said carrier,
    (d) a clamping means connected to said frame and operable so as to be inserted a suitable distance within the case of bottles, (e) clamp opening means above said clamping means and within said frame and operable so as to open said clamping means when said clamping means is inserted within the case, (f) spring means for closing said clamping means around the necks of the bottles when the clamp opening means is released, and (g) means for raising said frame with said clamping means engaged with the bottles so as to present the bottles at a predetermined elevation for concurrent processing of all the bottles, said driving means including an endless chain drive, spaced dogs attached to such chain and movable with said chain, a bell crank attached to the carrier and operable to engage and disengage said dogs at a predetermined time and a solenoid contacting said bell crank and operable to actuate said bell crank into and out of the path of said dogs to engage or disengage a dog as may be necessary to the effect that said carrier may be moved to a processing station and pause at such station without the necessity of stopping the chain drive.

5. An apparatus as claimed in claim 4 comprising an actuating means operable to rotate said clamp opening means out of the way, of the bottles to facilitate the processing of such bottles.

6. An apparatus as claimed in claim 4 characterized in that said clamping means includes a bottle plate having openings in which the necks of the bottles are inserted, guides connected below said bottle plate and diverging downwardly below the bottle plate openings to facilitate the entrance of the bottles within said openings, a plurality of stationary jaws above and adjacent the bottle plate openings, a plurality of opposed movable jaws supported above said bottle plate and having laterally extending keyways, key tracks perpendicular to said jaws engaging said keyways thereby permitting lateral movement of said movable jaws and springs forcing said movable jaws against said stationary jaws to clamp the necks of the bottles.

7. An apparatus of claim 4 characterized in that means for moving said frame vertically comprising a cam track extending linearly adjacent the carrier path and a cam follower integral to said frame and in which said cam follower rides along said cam tracks.

8. An apparatus of claim 6 characterized in that said jaws include friction means at said semi-circular cut-outs cut-outs operable to provide as many openings as there are bottles in the case.

9. A structure as claimed in claim 8 characterized in that said movable jaws have a plurality of holes and said clamp opening means include a pin carrying plate having pins extending vertically downwardly and operable to be inserted into said holes and an actuating means attached to and moving said plate laterally so as to actuate the movable jaws against said spring means, and away from said stationary jaws to thereby open and release the bottles.

10. A structure as in claim 8 characterized in that said jaws include friction means at said semi-circular cut-outs to provide additional securing means to better hold said bottles.

11. An apparatus as claimed in claim 8 characterized in that said jaws include cushioning means at said semi-circular openings to provide cushioning to protect the necks of the bottles from damage.

12. An apparatus as claimed in claim 5 further characterized in that said actuating means comprise a power means, a transmission means, a gear mounted at one end of said clamp openings means and driven by said transmission means to rotate said clamp opening means out of the way of the bottles to be processed.

13. An apparatus for setting up bottles to be processed concurrently at a processing station while substantially within their cases, comprising:

(a) a carrier supporting the case of bottles, (b) a disengageable driving means operable to move said carrier to a processing station, (c) a frame vertically movable on said carrier and operable to align the case on said carrier, (d) a clamping means connected to said frame and operable so as to be inserted a suitable distance within the case of bottles, (e) said clamping means includes a bottle plate having openings in which the necks of the bottles are inserted, guides connected below said bottle plate and diverging downwardly below the bottle plate openings to facilitate the entrance of the bottles within said openings, a plurality of stationary jaws above and adjacent the bottle plate openings, a plurality of opposed movable jaws supported above said bottle plate and having laterally extending keyways, key tracks perpendicular to said jaws engaging said keyways thereby permitting lateral movement of said movable jaws and springs forcing said movable jaws against said stationary jaws to clamp the necks of the bottles, (f) clamp opening means above said clamping means and within said frame and operable so as to open said clamping means when said clamping means is inserted within the case, (g) spring means for closing said clamping means around the necks of the bottles when the clamp opening means is released, and (h) means for raising said frame with said clamping means engaged with the bottles so as to present the bottles at a predetermined elevation for concurrent processing of all the bottles.

References Cited by the Examiner
UNITED STATES PATENTS

| | | | |
|---|---|---|---|
| 339,053 | 3/1886 | Goransson | 141—172 X |
| 1,418,146 | 5/1922 | Fogle | 53—267 |
| 2,520,727 | 8/1950 | Keith et al. | 53—166 |
| 2,712,405 | 7/1955 | Rockcastle | 53—166 |
| 2,807,125 | 9/1957 | George | 53—166 |
| 2,946,164 | 7/1960 | Potts et al. | 53—26 |
| 2,983,596 | 5/1961 | Cella et al. | 53—26 |

FRANK E. BAILEY, *Primary Examiner.*

ROBERT A. LEIGHEY, TRAVIS S. McGEHEE,
*Examiners.*

A. E. FOURNIER, R. L. FARRIS, *Assistant Examiners.*